United States Patent
Tsuchiya et al.

[11] Patent Number: 5,924,958
[45] Date of Patent: Jul. 20, 1999

[54] CONTROL SYSTEM FOR AUTOMATIC TRANSMISSION WITH SERVO FILL OF SECOND SHIFT ENGAGEMENT ELEMENT DURING COMPLETION OF FIRST SHIFT WHEN SECOND SHIFT COMMANDED DURING FIRST SHIFT

[75] Inventors: Saoto Tsuchiya; Masaaki Nishida; Yoshihisa Yamamoto; Akitomo Suzuki; Hiroshi Tsutsui, all of Anjo, Japan

[73] Assignee: Aisin AW Co., Ltd., Japan

[21] Appl. No.: 08/839,824

[22] Filed: Apr. 18, 1997

[30] Foreign Application Priority Data

Apr. 19, 1996 [JP] Japan ..................... 8-098957

[51] Int. Cl.$^6$ ............................................. F16H 61/08
[52] U.S. Cl. ..................... 477/145; 477/144; 477/148; 477/154
[58] Field of Search ................. 477/143, 144, 477/148, 149, 154, 156, 158, 141

[56] References Cited

U.S. PATENT DOCUMENTS

| | | | |
|---|---|---|---|
| 4,955,257 | 9/1990 | Terayama et al. ................ | 477/154 |
| 5,431,604 | 7/1995 | Marusue et al. ................... | 477/143 X |
| 5,439,427 | 8/1995 | Enokido et al. ................... | 477/143 X |
| 5,624,351 | 4/1997 | Fujita et al. ....................... | 477/148 |
| 5,647,819 | 7/1997 | Fujita et al. ....................... | 477/143 |
| 5,816,950 | 10/1998 | Kamada et al. .................... | 477/148 |

*Primary Examiner*—Charles A. Marmor
*Assistant Examiner*—Ankur Parekh
*Attorney, Agent, or Firm*—George A. Loud; Lorusso & Loud

[57] ABSTRACT

If a shift to the 3rd speed is decided during the 5th-4th speed shift, in which the hydraulic servo for a second clutch is released by pressure regulation control, a changeover valve is switched by a solenoid valve so that the fluid pressure $P_{C2}$ from the pressure regulating valve is conducted to a third clutch hydraulic servo. Thereby, the third clutch hydraulic servo pressure $P_{C3}$ stands by at a predetermined engaging pressure $P_H$ and, at the same time, the servo-start of a fourth brake fluid pressure $P_{B4}$ is performed by another pressure regulating valve. Meanwhile, the fluid pressure $P_{C2}$ is released by an accumulator. After the servo-start ends and the 4th speed is established, the 4-3 speed shift control is performed, thus preventing shift shock and reducing shift duration.

9 Claims, 6 Drawing Sheets

| | C1 | C2 | C3 | B1 | B2 | B3 | B4 | B5 | F1 | F2 |
|---|---|---|---|---|---|---|---|---|---|---|
| 1ST | O | | | | | (O) | | O | | O |
| 2ND | O | | | (O) | O | | | O | O | |
| 3RD | O | | | (O) | O | | O | | O | |
| 4TH | O | | O | (O) | O | | | | O | |
| 5TH | O | O | O | | | | | | | |
| 3Low | O | O | | | O | | | O | | |
| 4Low | O | O | | | O | | O | | | |
| REV | | O | | | | O | | O | | |

(O) Indicating Engine Braking

| thr0 \ thr | 0% | 5% | ---- | 90% | 100% |
|---|---|---|---|---|---|
| 0% | 0 | 0 | ---- | −90 | −100 |
| 5% | 10 | 0 | ---- | −80 | |
| ⋮ | ⋮ | ⋮ | | ⋮ | ⋮ |
| 90% | 180 | 175 | ---- | 0 | 0 |
| 100% | 200 | 190 | ---- | 10 | 0 |

[N·m]

CONTROL SYSTEM FOR AUTOMATIC TRANSMISSION WITH SERVO FILL OF SECOND SHIFT ENGAGEMENT ELEMENT DURING COMPLETION OF FIRST SHIFT WHEN SECOND SHIFT COMMANDED DURING FIRST SHIFT

BACKGROUND OF THE INVENTION

1. Field of the Invention

The present invention relates to an automatic transmission for a motor vehicle and, more particularly, to a transmission control apparatus capable of, during progress of a shift operation to one speed, deciding and initiating a shift to a different speed (overlap shift).

2. Description of the Related Art

One type of known automatic transmission includes a main speed shift mechanism providing three forward speeds and one reverse speed and an auxiliary speed shift mechanism providing three speeds. The combination achieves multiple speeds, for example, five forward speeds and one reverse speed. Such an automatic transmission may make a shift decision dictating a shift involving one of the two shift mechanisms during a shift operation of the other shift mechanism. For example, while the automatic transmission is performing the 5th-to-4th speed shift (a first shift) operation by releasing a predetermined frictional engagement element (C2 clutch) of the main speed shift mechanism (and simultaneously engaging a one-way clutch F1), a decision may be made to shift to the 3rd speed (a second shift) by changing over the engagement of two frictional engagement elements (by releasing a C3 clutch and engaging a B4 brake) of the auxiliary speed shift mechanism.

One such conventional automatic transmission, disclosed in examined Japanese patent application publication No. HEI-5-50621, determines that the operation of shifting to a given speed, responsive to a first shift instruction, has been completed on the basis of a determination that the input and output rotational speed ratio, at the speed dictated by the first shift instruction, is approximately 1.0, over at least a predetermined length of time. If a second shift instruction, different from the first speed shift instruction, generated during the period between the output of the first shift instruction and the completion of the shift dictated by the first instruction, the automatic transmission prevents a shift operation responsive to the second shift instruction. That is, if during a first shift operation a decision for a second shift operation is made, the automatic transmission inhibits the second shift operation until the first shift operation is completed. This shift operation inhibition prevents deviation of the timing of engagement changeover of frictional engagement elements, thus preventing a rapid engine speed increase or an abnormal engine speed reduction. However, because the second shift is inhibited until the first shift operation is completed, this conventional system has problems in that the shift time between the start of the first shift and the completion of the second shift is prolonged.

SUMMARY OF THE INVENTION

In view of the foregoing, it is an object of the present invention to provide a control system for an automatic transmission that prevents a shift shock and reduces shift time in a case where, during the progress of a first shift, a second shift is decided.

Accordingly, the present invention provides a control system for an automatic transmission including a control unit that receives signals from sensors indicative of various vehicle running conditions and outputs hydraulic control signals to a plurality of hydraulic control means for controlling fluid pressure to hydraulic servos for a plurality of predetermined frictional engagement elements. The control unit has overlap shift control means for, if during progress of a first shift a second shift is decided on the basis of signals from the sensors, outputting the hydraulic control signals so as to servo-start fluid pressure to frictional engagement elements that are to be engaged in the second shift so that the servo pistons will be moved forward to bring the frictional engagement elements to the state which immediately precedes (on the verge of) transmission of torque by those elements, and so as to initiate the second shift when the servo-start is completed and a predetermined speed is substantially established by the first shift.

The terminology "servo-start," as used herein, has the same meaning as "fill phase" as used in the prior art. See, for example, the teaching at column 2, lines 29–35 of U.S. Pat. No. 4,707,789, the teachings of which are incorporated herein by reference.

In the present invention if, during the operation of a first shift, a second shift is decided, the second shift decision is immediately followed by initiation of servo-start of fluid pressure to the frictional engagement elements that are to be engaged for the second shift. After the servo-start is completed and a predetermined speed is substantially established by the first shift, the control system initiates the second shift.

Since the second shift decision is immediately followed by initiation of servo-start for the second shift, the time lag is is correspondingly reduced, thus reducing the shift time for a overlap-speed shift. In addition, since the second shift operation is started after the servo-start has been completed and a predetermined speed has been substantially established by the first shift, the shift feels smooth.

Preferably, the second shift is an engagement changeover shift that engages a first frictional engagement element and releases a second frictional engagement element and wherein, on the basis of decision to make the second shift, the servo-start of the fluid pressure to the first friction engagement element to be engaged is initiated, and the fluid pressure to the second frictional engagement element to be released is maintained at a predetermined engaging pressure.

In the case where the second shift is an engagement changeover shift, simultaneous start of the shift operation of the friction engagement elements would, in the prior art systems, cause an unnecessary engine speed rise because of a mistimed coordination where the releasing-side fluid pressure is discharged while the engaging-side fluid pressure is regulated by servo-start to reposition the servo piston. However, with the preferred arrangement of the present invention, the control apparatus servo-starts the engaging-side fluid pressure and maintains the releasing side fluid pressure at a predetermined engaging pressure before starting the second shift operation. After the servo-start, the second shift operation is performed by the engagement changeover. Thereby, the present invention is able to achieve good timing of the engagement changeover of the releasing and engaging frictional engagement elements and to prevent shift shock.

It is also preferred that the first shift achieve the predetermined speed by releasing a third frictional engagement element, and that a hydraulic servo for the third frictional engagement element be connected in communication with an accumulator. With this preferred construction, the control apparatus is able to smoothly continue releasing the third frictional engagement element for the first shift operation by using the accumulator, thus reducing shift shock. By limiting the use of the accumulator to only overlap shifts, the capacity of the accumulator can be reduced as compared with that of a typical accumulator for the conventional automatic transmission. The size reduction of the accumulator enables overall size reduction of the automatic transmission.

Preferably, the control system of the invention further includes a changeover valve for switching fluid pressure from one of the plurality of hydraulic servos over to the hydraulic servo for the third frictional engagement element and to a hydraulic servo for the second frictional engagement element. Based on the decision to make the second shift, the control system switches the changeover valve so that the fluid pressure to one of the plurality of hydraulic control means is switched from the hydraulic servo for the third frictional engagement element to the hydraulic servo for the second frictional engagement element. This embodiment enables the control system apparatus to change over the pressure regulation control of the hydraulic servo of the third frictional engagement element for the first shift, and the pressure regulation control of the hydraulic servo of the second frictional engagement element for the second shift, using only a single unit of hydraulic control means, that is, by switching the changeover valve. The control apparatus of the invention thus eliminates the need to employ expensive hydraulic control means, for example a linear solenoid valve, and thereby achieves a cost reduction.

In yet another preferred embodiment, the automatic transmission includes a main speed shift mechanism and an auxiliary speed shift mechanism, and the first shift is performed by changing the transmission path established by one of the main speed shift mechanism and the auxiliary speed shift mechanism, and the second shift is performed by changing the transmission path of the other of the main speed shift mechanism and the auxiliary speed shift mechanism. In this preferred embodiment, the invention is able to smoothly perform an overlap shift that involves the changing of both the transmission path in the main speed shift mechanism and the transmission path in the auxiliary speed shift mechanism.

Preferably, the control system of the invention estimates the input torque at the point in time when the second shift is decided, and starts operation of the second shift by using a fluid pressure in accordance with that estimated input torque. The input torque at the time of decision to make the second shift is determined by calculating a correction value from the difference between the throttle opening that dictated the first shift instruction to execute the first shift and the throttle opening detected when the second shift is decided, and by applying that calculated correction value to the input torque that serves as a basis for the hydraulic control of the first shift. When an engine is in a transitional state, a time lag is normally inevitable in detection of engine speed. Therefore, estimation of the input torque during the second shift operation based on a detected engine speed will cause an undesirable response delay in the hydraulic control. However, since the control system of this preferred embodiment estimates such an input torque by correcting the input torque data used for the first shift operation on the basis of a throttle opening change, the control system of this embodiment is able to prevent a response delay in the hydraulic control.

BRIEF DESCRIPTION OF THE DRAWINGS

The foregoing and further objects, features and advantages of the present invention will become apparent from the following description of a preferred embodiment with reference to the accompanying drawings, wherein:

FIG. 7($b$) is a graph showing the change of the input torque correction value depending on the differences between the two values of throttle opening for the first and second shift operations.

DETAILED DESCRIPTION OF PREFERRED EMBODIMENT

An embodiment of the present invention will be described hereinafter with reference to the accompanying drawings.

Figures 1, 2:
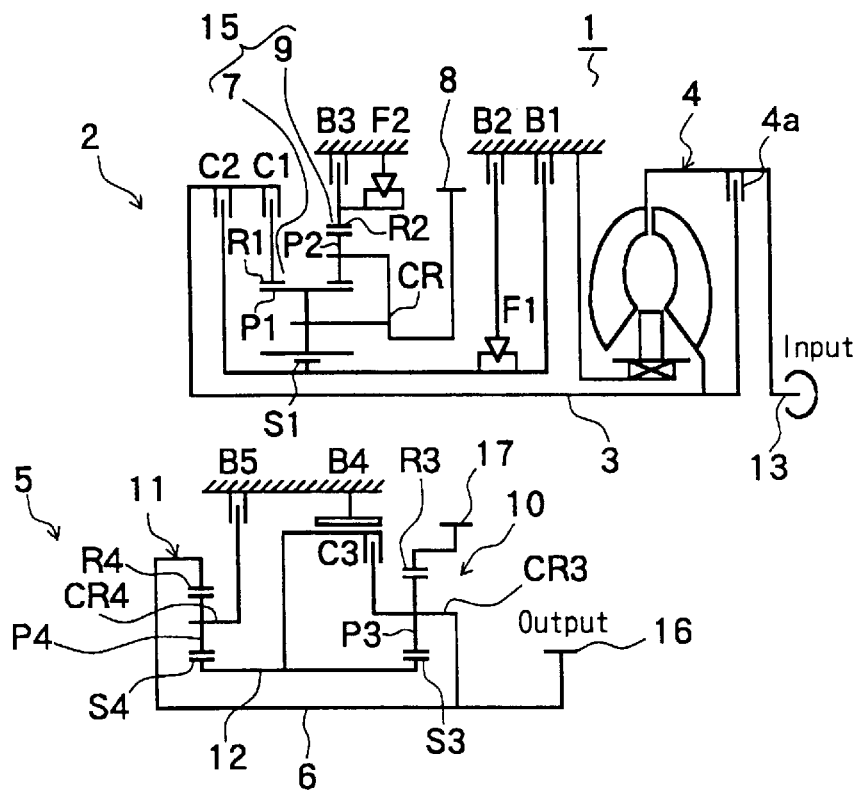
FIG. 1 is a skeletal diagram of the mechanical portions of an automatic transmission to which the present invention is applicable.
FIG. 2 is a table of the operations of the friction engagement elements of the automatic transmission.

Referring to FIG. 1, a five-speed automatic transmission 1 includes a torque converter 4, a three-speed main speed shift mechanism 2, a three-speed auxiliary speed shift mechanism 5 and a differential (not shown) which are connected together and contained within an integrally built case. The torque converter 4 comprises a lockup clutch 4$a$ and transmits torque from an engine crank shaft 13 to the main speed shift mechanism 2 fluidically through the fluid coupling of the torque converter 4 or mechanically through the lockup clutch 4$a$. The integral case rotatably supports a first shaft 3 (specifically, an input shaft), a second shaft 6 (counter shaft) disposed parallel to the first shaft 3, and a third shaft (right and left wheel axle shafts). A valve body is disposed on an outer face of the case.

The main speed shift mechanism 2 has a planetary gear unit composed of a simple planetary gear set 7 and a double-pinion planetary gear set 9. The simple planetary gear set 7 is made up of a long sun gear S1, a ring gear R1, and a carrier CR supporting pinions P1 meshed with the sun gear S1 and the ring gear R1. The double-pinion planetary gear set 9 is made up of the same long sun gear S1, a ring gear R2, and the same carrier CR, which supports the same long pinions P1 meshed with the sun gear S1 and pinions P2 meshed with the ring gear R2 so that the pinions P1 and the pinions P2 mesh.

The input shaft 3 cooperatively connected to the engine crank shaft 13 by the torque converter 4 can be connected to the ring gear R1 of the simple planetary gear set 7 by a first (forward) clutch C1, and to the common sun gear S1 by a second (direct) clutch C2. The sun gear S1 can be stopped directly by a first brake B1, and it can also be stopped by a second brake B2 by way of a first one-way clutch F1. The ring gear R2 of the double-pinion planetary gear set 9 can be stopped by a third brake B3 and also by a second one-way clutch F2. The common carrier CR is fixed to a counter drive gear 8 that serves as an output for the main speed shift mechanism 2.

The auxiliary speed shift mechanism (section) 5 comprises an output gear 16, a first simple planetary gear set 10 and a second simple planetary gear set 11 which are disposed in that order toward the rear along the axis of the counter shaft 6 forming the second shaft. The counter shaft 6 is rotatably supported on the integral case by bearings. The first and second simple planetary gear sets 10, 11 are of the Simpson type.

The ring gear R3 of the first simple planetary gear set 10 is connected to a counter driven gear 17 meshed with the counter drive gear 8. The sun gear S3 is fixed to a sleeve shaft 12 rotatably supported by the counter shaft 6. The pinions P3 are supported by a carrier CR3 formed by a flange fixed to the counter shaft 6. The carrier CR3, supporting the pinions P3, is connected to an inner hub of a UD direct clutch C3. The sun gear S4 of the second simple planetary gear set 11 is connected to the sun gear S3 of the first simple planetary gear set. The ring gear R4 of the second simple planetary gear set 11 is connected to the counter shaft 6.

The UD direct clutch C3 is disposed between the carrier CR3 of the first simple planetary gear set and the coupled sun gears S3, S4. The coupled sun gears S3, S4 can be stopped by a fourth brake B4 which is a band brake. The carrier CR4 of the second simple planetary gear set supporting the pinions P4 can be stopped by a fifth brake B5.

Figure 3:
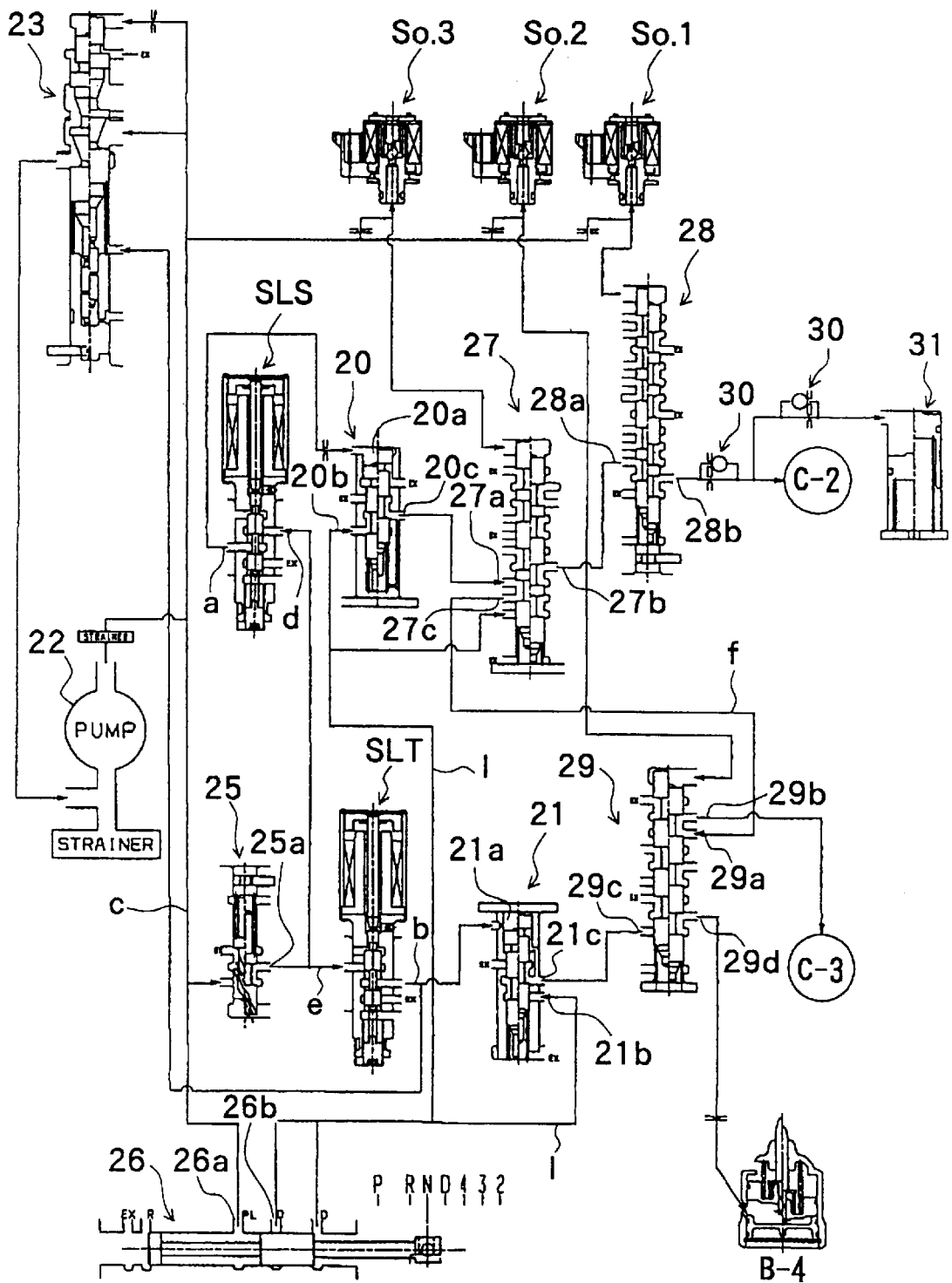
FIG. 3 is the hydraulic control circuit of the automatic transmission.

The hydraulic control circuit used in the five-speed preferred embodiment of the automatic transmission will now be described with reference to FIGS. 2 and 3. FIG. 3 shows only those elements of the hydraulic circuit that are necessary to illustrate the operation of this preferred embodiment, although the actual circuit has a more complicated construction comprising many more components.

In FIG. 3, So. 1, So. 2 and So. 3 denote on-off controlled solenoid valves (normally closed); and SLS and SLT denote linear solenoid valves. The (first) solenoid valve SLS is provided solely for regulating the fluid pressure supply to various hydraulic servos. The (second) solenoid valve SLT is operated responsive to change of the throttle opening by operation of the accelerator pedal, and its main function is regulation of the throttle pressure. The (second) solenoid valve SLT also provides auxiliary pressure regulation for the hydraulic servos.

A shift pressure control valve 20 and a B-4 control valve 21 have control fluid chambers 20a, 21a that receive the control pressure from output ports a, b of the linear solenoid valves SLS, SLT, respectively. Based on the control pressure, the control valves 20, 21 regulate the line pressure supplied into their input ports 20b, 21b and output the regulated pressure from the output ports 20c, 21c. The linear solenoid valve SLT, provided mainly for throttle pressure control as described above, supplies the throttle pressure as a control fluid pressure to a primary regulator valve (described later) within a normal line pressure control operating range. In a marginal range, beyond the normal line pressure control operating range, pressure regulation is provided by the B-4 control valve.

FIG. 3 further shows a hydraulic pump 22, a primary regulator valve 23 and a solenoid modulator valve 25. Based on the output fluid pressure (throttle pressure) from the linear solenoid valve SLT, the primary regulator valve 23 regulates the fluid pressure from the hydraulic pump 22 to the line pressure and outputs it to a line pressure fluid passage c. The solenoid modulator valve 25 reduces the line pressure and supplies the fluid pressure from its output port 25a to the input ports d, e of the linear solenoid valves SLS, SLT. A manual valve 26 connects its line pressure port 26a to various ports corresponding to the shift position of a shift lever, for example, to its output port 26b, depending on whether the shift lever is in the D, 4th, 3rd or 2nd position.

FIG. 3 further shows a pressure relay valve 27, a second (M2) shift valve 28 for the main speed shift mechanism, and a first (U1) shift valve 29 for the auxiliary speed shift mechanism, which in combination serve as changeover means for changing over between the supply of fluid pressure and the discontinuation thereof to the hydraulic servos C-2, C-3, B-4 for the second clutch, the third clutch and the fourth brake. The second clutch hydraulic servo C-2 is connected in communication with a C2 accumulator 31 by an orifice 30 provided with a check valve. The C2 accumulator 31 has a relatively simple construction with a small capacity.

Figure 4:
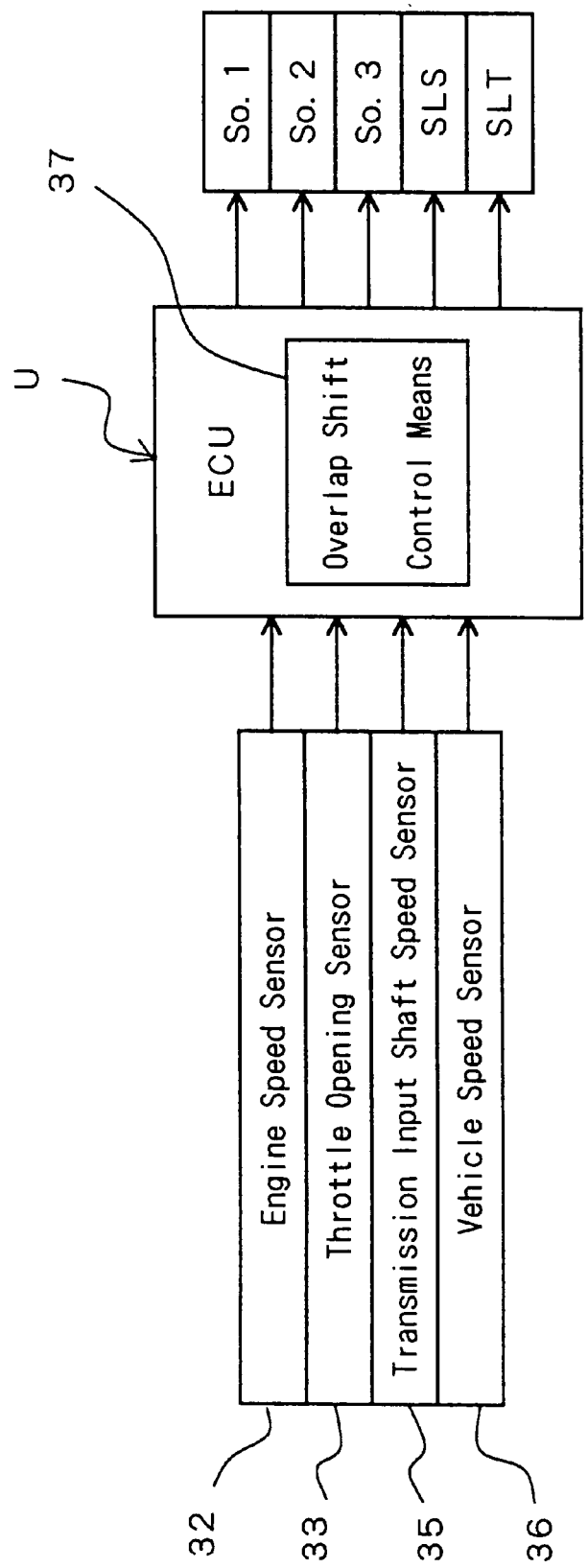
FIG. 4 is a block diagram of the electronic control apparatus of the automatic transmission.

FIG. 4 schematically illustrates the electronic section of the control system. An electronic control unit U receives electric signals from an engine speed sensor 32, a throttle opening sensor 33, an automatic transmission input rotational speed (turbine speed) sensor 35, and a vehicle speed (output rotational speed) sensor 36. The control unit has overlap shift control means 37 for outputting signals to the three solenoid valves So.1, So.2, So.3 and the two linear solenoid valves SLS, SLT on the basis of the calculations by the control unit.

The operation of the mechanical portions of the five-speed automatic transmission according to this embodiment will now be described with reference to FIGS. 1 and 2.

For the first (1st) speed in the D (drive) range, the forward clutch C1 engages and the second one-way clutch F2 and the fifth brake B5 engage so that rotation of the ring gear R2 of the double-pinion planetary gear set and of the carrier CR4 of the second simple planetary gear set 11 are stopped. In this state, the rotation of the input shaft 3 is transmitted to the ring gear R1 of the simple planetary gear set by the forward clutch C1. Since the ring gear R2 of the double-pinion planetary gear set is held in the stopped state, the common carrier CR rotates in the forward direction at a considerably reduced speed while the sun gear S1 idles in the reverse direction. Thus the main speed shift mechanism 2 is in the first speed state. The reduced rotation is then transmitted to the ring gear R3 of the first simple planetary gear set of the auxiliary speed shift mechanism 5 by the counter gears 8, 17. Since the carrier CR4 of the second simple planetary gear set of the auxiliary speed shift mechanism 5 is stopped by the fifth brake B5, thus establishing the first speed state of the auxiliary speed shift mechanism 5, the auxiliary speed shift mechanism 5 further reduces the reduced rotational speed from the main speed shift mechanism 2 and outputs the further reduced rotational speed from the output gear 16.

For the second (2nd) speed, the second brake B2 (and the first brake B1) become engaged in addition to the forward clutch C1. Furthermore, the second one-way clutch F2 is disengaged and the first one-way clutch F1 engages instead, while the fifth brake B5 is maintained in engagement. In this state, the common sun gear S1 is stopped by the second brake B2 and the first one-way clutch F1, so that the rotation of the ring gear R1 of the simple planetary gear set transmitted from the input shaft 3 by the forward clutch C1 rotates the carrier CR at a reduced speed in the forward direction while idly rotating the ring gear R2 of the double-pinion planetary gear set in the forward direction. The reduced rotational speed is then transmitted to the auxiliary speed shift mechanism 5 by the counter gears 8, 17. The main speed shift mechanism 2 is thus in the second speed state while the auxiliary speed shift mechanism 5 is in the first speed state, due to the engagement of the fifth brake B5, which combination achieves the second speed of the entire automatic transmission 1.

For the third (3rd) speed, the forward clutch C1, the second brake B2 and the first one-way clutch F1 are maintained in engagement, but the fifth brake B5 is released from engagement and the fourth brake B4 is engaged. That is, the state of the main speed shift mechanism 2 remains unchanged, so that rotation is transmitted to the auxiliary speed shift mechanism 5 by the counter gears 8, 17 in the same manner as in the second speed described above. In the auxiliary speed shift mechanism 5, the rotation from the ring gear R3 of the first simple planetary gear set is output as second speed rotational speed from the carrier CR3 because the sun gear S3 is fixed. The combination of the second speed of the main speed shift mechanism 2 and the second speed of the auxiliary speed shift mechanism 5 achieves the third speed of the entire automatic transmission 1.

For the fourth (4th) speed, the main speed shift mechanism 2 remains in the same state as for the second and third speeds, wherein the forward clutch C1, the second brake B2 and the first one-way clutch F1 are engaged, but the auxiliary speed shift mechanism 5 releases the fourth brake B4 and engages the UD direct clutch C3. In this state, the ring gear R3 of the first simple planetary gear set and the sun gears S3, S4 are coupled to achieve locked-up rotation in which the planetary gear sets 10, 11 rotate together. The combination of the second speed of the main speed shift mechanism 2 and the locked-up rotation (third speed) of the auxiliary speed shift mechanism 5 results in the fourth speed rotation of the entire automatic transmission output from the output gear 16.

For the fifth (5th) speed, the forward clutch C1 and the direct clutch C2 engage to transmit the rotation of the input shaft 3 to both the ring gear R1 of the simple planetary gear set and the sun gear S1. The main speed shift mechanism 2 thus undergoes locked-up rotation wherein its gear units rotate together. The auxiliary speed shift mechanism 5 remains in the locked-up rotational state, where the UD direct clutch C3 is engaged. The combination of the third speed (locked-up rotation) of the main speed shift mechanism 2 and the third speed (locked-up rotation) of the auxiliary speed shift mechanism 5 results in the fifth speed rotation of the entire automatic transmission output from the output gear 16.

The automatic transmission also provides intermediate speeds that are temporarily established during downshifts for acceleration and the like, that is, a third speed low and a fourth speed low.

For the third speed low, the forward clutch C1 and the direct clutch C2 engage (the second brake B2 also engages but the braking effect is canceled by the one-way clutch F1). Thus the main speed shift mechanism 2 assumes the third speed state, wherein the planetary gear unit 15 is locked up. The auxiliary speed shift mechanism 5 engages the fifth brake B5, assuming the first speed state. With the combination of the third speed state of the main speed shift mechanism 2 and the first speed state of the auxiliary speed shift mechanism 5, the automatic transmission 1 achieves the intermediate speed whose gear ratio is set between those of the second and third speeds.

For the fourth speed low, the main speed shift mechanism 2 assumes the third speed (locked-up) state as in the third speed low, wherein the forward clutch C1 and the direct clutch C2 are engaged. On the other hand, the auxiliary speed shift mechanism 5 assumes the second speed state, where the fourth brake B4 is engaged and the sun gear S3 of the first simple planetary gear set 10 is fixed. With the combination of the third speed state of the main speed shift mechanism 2 and the second speed state of the auxiliary speed shift mechanism 5, the automatic transmission 1 achieves the intermediate speed whose gear ratio is set between those of the third and fourth speeds.

In the table of FIG. 2, the dotted circles indicate that engine braking is in effect during running downhill (the 4th, 3rd or 2nd range). During the 1st speed, the third brake B3 engages to prevent rotation of the ring gear R2, which would otherwise be allowed by the overrunning of the second one-way clutch F2. During the 2nd, 3rd and 4th speeds, the first brake B1 engages to prevent rotation of the sun gear S1, which would otherwise be allowed by the overrunning of the first one-way clutch F1.

For the R (reverse) range, the direct clutch C2 and the third brake B3 engage, and the fifth brake B5 also engages. In this state, the rotation of the input shaft 3 is transmitted to the sun gear S1 by the direct clutch C2, and the carrier CR rotates in reverse while the ring gear R1 of the simple planetary gear set idles, also in the reverse direction since the ring gear R2 of the double-pinion planetary gear set is stopped by the third brake B3. The reverse rotation of the carrier CR is transmitted to the auxiliary speed shift mechanism 5 by the counter gears 8, 17. The auxiliary speed shift mechanism 5 is maintained in the first speed state, where the carrier CR4 of the second simple planetary gear set is stopped in both directions by the fifth brake B5. With the combination of reverse rotation of the main speed shift mechanism2 and the first speed rotation of the auxiliary speed shift mechanism 5, the automatic transmission 1 outputs reverse speed-reduced rotation from the output shaft 16.

Figure 5:
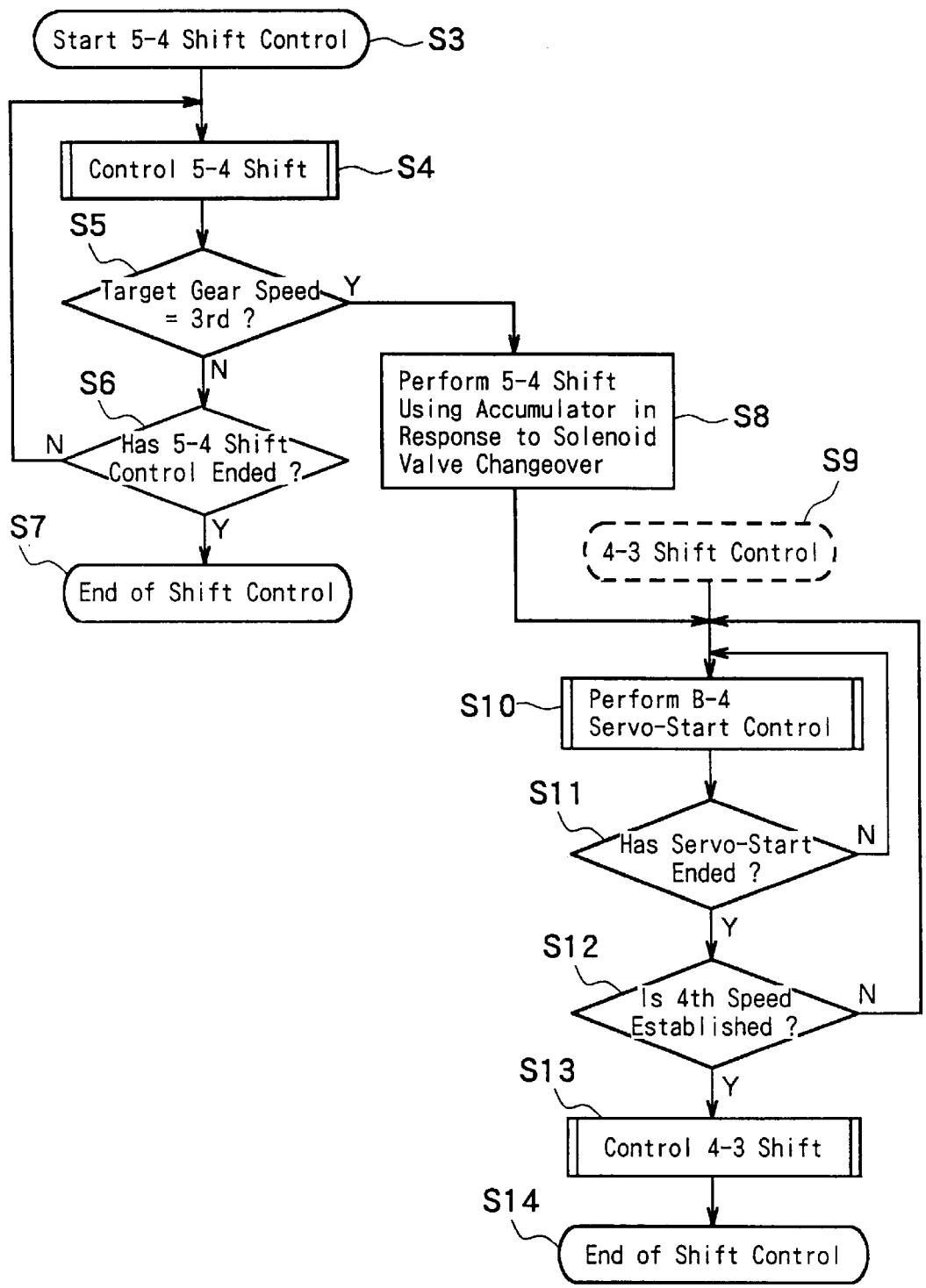
FIG. 5 is a flowchart of the overlap shift control routine according to an embodiment of the invention.
Figure 6:
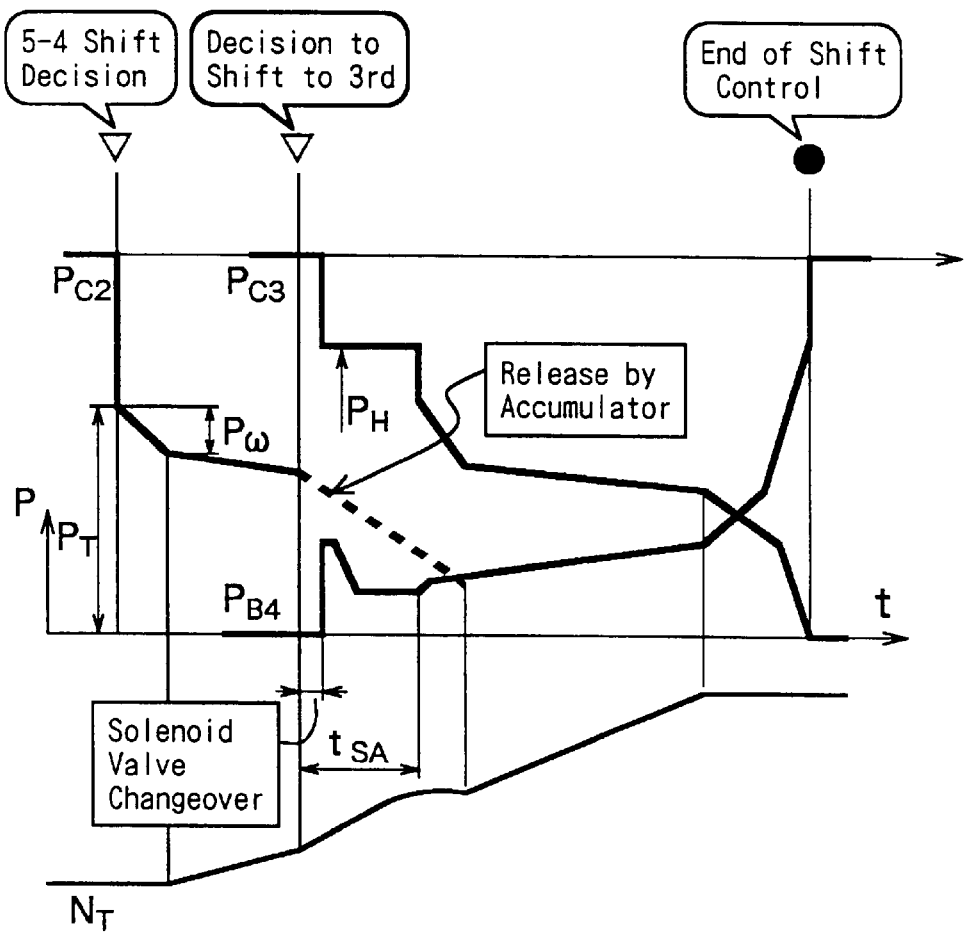
FIG. 6 is a timing chart illustrating the overlap shift control.

With reference to FIGS. 5 and 6, when the 5th-to-4th speed shift is decided, the shift control is started (S3). At this moment, the solenoid valve So.1 is energized and therefore opened, so that the M2 shift valve 28 is in the position indicated by the left half of its illustration in FIG. 3. The solenoid valve So. 3 is not supplied with electric power and is therefore closed, so that the pressure relay valve 27 is in the position indicated by the right half of its illustration. The solenoid valve So.2 also receives no electric power and is therefore closed, so that the U1 shift valve 29 is in the position indicated by the right half of its illustration. Thus, the line pressure from the D range port 26b of the manual valve 26 is input to the input port 20b of the shift pressure control valve 20 through a fluid passage 1. The shift pressure control valve 20 suitably regulates the pressure and outputs the regulated pressure from the output port 20c. The regulated pressure is supplied to the second clutch hydraulic servo C-2 and the C2 accumulator 31, through the ports 27a, 27b of the pressure relay valve 27 and the ports 28a, 28b of the M2 shift valve 28. The 5th-to-4th speed shift is then effected by the main speed shift mechanism 2 releasing the second clutch C2 (S4). First, the linear solenoid valve SLS is controlled on the basis of a signal from the electronic control unit U, so that the shift pressure control valve 20 regulates pressure within a range such that the second clutch C2 does not relatively rotate, that is, to a holding pressure PT sufficient to hold the torque. For this pressure regulation, a turbine (input) torque is estimated by determining an engine torque from a map based on the throttle opening and the engine speed, calculating a speed ratio from the input and output rotational speeds of the torque converter, determining a torque ratio from a map based on the calculated speed ratio, and then multiplying the torque ratio by the engine torque. This control step also calculates a target rotational speed change rate (target rotational acceleration) ω' of the input shaft, targeted for when the input shaft speed starts to change.

Then, as indicated in FIG. 6, the releasing-side fluid pressure $P_{C2}$ is swept down from the target engaging fluid pressure $P_T$ set for a period immediately before the input rotational speed starts to change (immediately before the inertia phase), calculated from the aforementioned turbine torque, by a fluid pressure change amount Pω calculated from the target rotational speed changing rate ω'. This down-sweep is continued until the change in the input shaft speed reaches a shift start determining rotational speed that is detectable by the input shaft speed sensor 35. That is, the shift start is determined at the point in time when the fluid pressure amount Pω corresponding to the inertia torque, calculated from the target rotational speed change rate, becomes zero. Normally, at this point in time, the engine torque (that is, input torque) balances with the vehicle driving load determined by the torque capacity of the releasing friction engagement elements. Subsequent to this point in time, the torque capacity of the releasing frictional engagement elements decreases below the engine torque so that the engine speed starts to increase (the input shaft speed changes), and the input (turbine) rotational speed $N_T$ correspondingly starts to increase.

During the 5th-to-4th speed shift operation, it is determined whether the target gear speed is the 3rd speed, that is, whether a shift to the 3rd speed has been decided (S5). If the shift to the 3rd speed has not been decided, the 5th-to-4th speed shift operation is continued until the end of shift control (S6). The shift control then ends (S7). More specifically, the torque capacity of the second clutch C2 is gradually reduced. As the second clutch C2 finally becomes released, the first one-way clutch F1 simultaneously becomes engaged. After the fluid pressure on the second clutch hydraulic servo C-2 is drained, the 5th-to-4th speed shift operation ends.

Conversely, if the shift to the 3rd speed is decided on the basis of, for example, a manual shift of the manual valve 26 to the 3rd range, during the 5th-to-4th speed shift operation, the control unit immediately turns off the solenoid valve So.1 to close it, and turns on the So.3 to open it, so that the M2 shift valve 28 switches to the position indicated by the right half of its illustration, and the pressure relay valve 27 switches to the position indicated by the left half of its illustration while the U1 shift valve 29 remains in the position indicated by the right half of its illustration (S8). In this state, the fluid pressure on the second clutch hydraulic servo C-2 and the C2 accumulator 31 is discharged from the port 28b of the M2 shift valve 28 to a drain port through the orifice 30 provided with a check valve. The regulated pressure from the output port 20c of the shift pressure control valve 20 is conducted to the third clutch hydraulic servo C-3 through a fluid passage f and the ports 29a, 29b of the U1 shift valve 29. The line pressure from the D range port 26b of the manual valve 26 is supplied to the input port 21b of the B-4 control valve 21 through the fluid passage 1. The B-4 control valve 21 suitably regulates the pressure on the basis of the control pressure from the linear solenoid valve SLT, and outputs the regulated pressure from the output port 21c to the fourth brake hydraulic servo B-4 through the ports 29c, 29d of the U1 shift valve 29. The 4th-to-3rd shift control (S9) controls an engagement changeover shift of the auxiliary speed shift mechanism 5 wherein the third clutch C3 is released and the fourth brake B4 is engaged. As indicated in FIG. 6, after a slight time delay due to the solenoid valve changeover, the shift pressure control valve 20, based on the control pressure from the linear solenoid valve SLS, regulates the pressure ($P_{C3}$) to a holding pressure $P_H$ that provides the third clutch C3 with a sufficient torque capacity within such a range that the third clutch C3 will not relatively rotate. In addition, based on the control pressure from the linear solenoid valve SLT, the B-4 control valve 21 performs servo-start as indicated by fluid pressure $P_{B4}$.

During this operation, the fluid pressure on the second clutch hydraulic servo C-2 is smoothly drained through the check valve of orifice 30, in accordance with the characteristics of the C2 accumulator 31, which communicates with the second clutch hydraulic servo C-2. Thus, if the shift to the 3rd speed is decided in any step of the 5th-to-4th speed shift operation, the main speed shift mechanism 2 will smoothly shift to a 4th-speed state where the second clutch C2 is released. In addition, during the upshift to the 5th speed by engaging the second clutch C2, the third clutch hydraulic servo C-3 is supplied with the regulated pressure based on the linear solenoid valve SLS, as in the downshift to the 4th speed. That is, the pressure on the third clutch hydraulic servo C-3 is regulated by electronic control, independently of the C2 accumulator 31. Therefore, since the C2 accumulator 31 is used only for the release operation during the overlap shift control as described above, the accumulator 31 is allowed to have less capacity than accumulators normally employed in conventional hydraulic control.

Furthermore, as a result of the changeover of the pressure relay valve 27 by the solenoid valve So.3 (S8), the linear solenoid valve SLS and the shift pressure control valve 20, previously (during the 5th-to-4th speed shift) used to provide the control pressure for the second clutch C2, are now used for regulation of pressure on the third clutch C3. The other linear solenoid valve SLT and the B-4 control valve 21 regulate the pressure on the fourth brake hydraulic servo B-4.

In the 4th-to-3rd speed shift control (S9), the servo-start control of the fluid pressure PB4 on the fourth brake hydraulic servo B-4, which is to be engaged for the 3rd speed, is performed (S10) immediately after a time lag due to the solenoid valve change over based on the decision to shift to the 3rd speed. More specifically, in this servo-start control procedure, the fourth brake hydraulic servo B-4 is temporarily supplied with a sufficient fluid pressure to start a piston stroke, and then the fluid pressure $P_{B4}$ is controlled so that the piston is held at a position that is slightly short of (on the verge of) the position initiating torque transmission. This control state is continued for a predetermined time tSA started by the timer (S11). The (releasing-side) fluid pressure $P_{C3}$ on the third clutch hydraulic servo C-3, which is to be released for the 3rd speed, is maintained at a standby level, that is, the predetermined fluid pressure $P_H$ that maintains the input torque provided during the 4th speed. The predetermined fluid pressure $P_H$ is maintained until the servo-start ends.

After it is determined that the 4th speed has been established, that is, it is determined that a state is established where the second clutch C2 is released and the first one-way clutch F1 is in operation, on the basis of detection of the completion of the servo-start and a change in the input (turbine) rotational speed $N_T$ (S12), the 4th-to-3rd speed shift control is performed (S13).

Figures 7A, 7B:
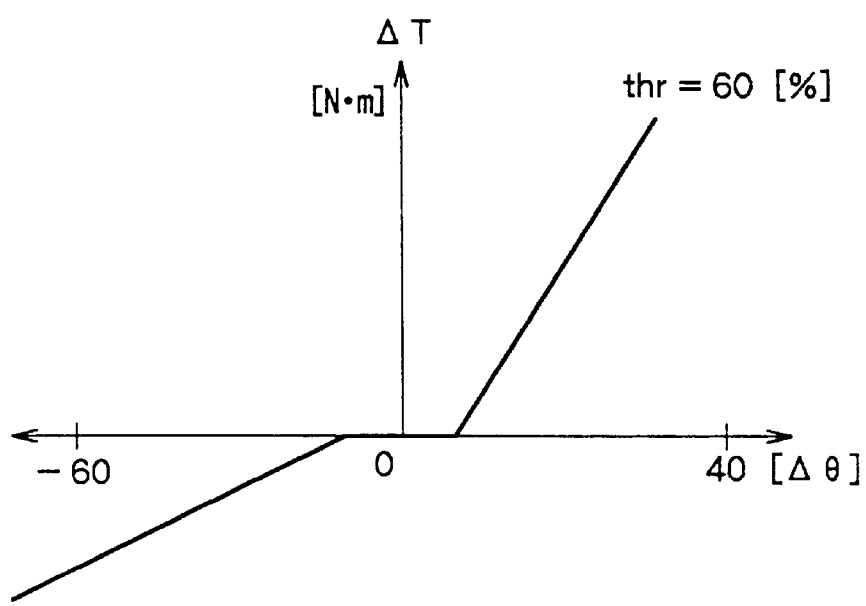
FIG. 7($a$) is a table of correction values for the input torque based on the throttle opening during a first shift operation and the throttle opening during a second shift operation.

In this control step, a turbine torque is estimated by correcting the turbine torque value estimated at the start of the 5th-to-4th speed shift, in accordance with the change in the throttle opening. That is, the turbine torque is corrected with an estimated change between the turbine torque at the start of the 5th-to-4th speed shift and the current turbine torque, and the estimated torque change is determined from a map based on the throttle opening tho at the time of the previous calculation and the current throttle opening thr, as indicated in FIG. 7A. The map is pre-arranged, as indicated in FIG. 7B, such that a current throttle opening (for example, thr=60%) provides an increased turbine torque correction value $\Delta T$ if the difference $\Delta \theta$ between the two throttle openings is a positive value (on the right side of the graph of FIG. 7B), that is, if the current throttle opening is greater than the throttle opening at the time of calculation for the 5th-to-4th speed shift (thr>tho), and such that the same current throttle opening provides a reduced turbine torque correction value $\Delta T$ if the throttle opening difference $\Delta \theta$ is a negative value (tho>thr). This map arrangement prevents shift shocks in cases where the current throttle opening thr is reduced from the throttle opening tho at the time of the calculation, that is, prevents excessive fluid pressure reductions in such cases, thus preventing the downshift operation from occurring too early, which would cause a shift shock.

The engine torque is estimated on the basis of a throttle opening change as described above, because it is difficult to directly estimate or detect an actual engine torque in transitional conditions where the engine torque changes, that is, it is difficult to accurately detect engine speed without a time lag in conditions where the difference between the actual engine torque and the automatic transmission input torque determined by the torque capacity of the frictional engagement elements becomes a load that acts on the engine (that is, conditions where the engine is driven by the transmission).

The turbine torque value, corrected from the previous turbine torque value as described above, is then used for calculation of a target fluid pressure value for the releasing-side fluid pressure Pc3, followed by calculation of a target rotational speed changing rate. Then, the releasing-side fluid pressure $P_{C3}$ is accordingly released so that the engaging-side fluid pressure $P_{B5}$ is increased in accordance with the releasing-side fluid pressure. When the automatic transmission reaches the inertia phase where a change in the input shaft rotational speed $N_T$ occurs (the start of the 4th-to-3rd speed shift), the releasing-side fluid pressure $P_{C3}$ is released so that it declines along a predetermined pressure gradient based on the rotational speed change while the engaging-side fluid pressure $P_{B4}$ is increased with a predetermined gradient in accordance with the releasing-side fluid pressure. Then the fourth brake B4 engages and the third clutch C3 is released, thus completing 4th-to-3rd speed shift. The completion control is then performed to completely drain the releasing-side fluid pressure $P_{C3}$ and regulate the engaging-side fluid pressure $P_{B4}$ to the line pressure, thus ending the shift control (S14).

Although the above embodiment has been described in conjunction with a case where the shift to the 3rd speed is decided during the 5th-to-4th speed shift, the embodiment may also be applied, in a similar manner, to other overlap shifts, for example, to a case where the shift to the 2nd speed is decided on the basis of manual movement of the manual valve 26 to the 2nd range during the 4th-to-5th speed shift.

While the present invention has been described with reference to what is presently considered to be a preferred embodiment thereof, it is to be understood that the invention is not limited to the disclosed embodiments. On the contrary, the invention is intended to cover various modifications and equivalent arrangements included within the spirit and scope of the appended claims.

What is claimed is:

1. A control system for an automatic transmission comprising:

a plurality of sensors for detecting various vehicle running conditions;

a plurality of hydraulic servos for operating respective frictional engagement elements to effect a first shift from a first speed to a second speed and a second shift from the second speed to a third speed;

a plurality of hydraulic control means for controlling fluid pressures to said plurality of hydraulic servos; and a control unit for deciding shifts and for outputting hydraulic control signals to said plurality of hydraulic control means to effect the decided shifts, responsive to signals received from said sensors, said control unit including overlap shift control means for, responsive to a control signal for the second shift generated during progress of the first shift, initiating servo-start of fluid pressure to hydraulic servos operating second shift frictional engagement elements that are engaged for the second shift, whereby pistons of the hydraulic servos which operate the second shift frictional engagement elements are moved to positions immediately preceding piston positions at which transmission of torque is initiated, said control unit causing start of the second shift when said servo-start is completed and the second speed is substantially established by the first shift.

2. A control system according to claim 1, wherein said second shift is an engagement changeover shift that engages a first frictional engagement element and releases a second frictional engagement element, and wherein, on the basis of decision to make said second shift, servo-start of fluid pressure to said first frictional engagement element is started, and fluid pressure to said second frictional engagement element is maintained at a predetermined engaging pressure.

3. A control system according to claim 2, further comprising an accumulator, a third frictional engagement element and a third hydraulic servo for operating said third frictional engagement element, said third hydraulic servo being connected in communication with said accumulator and wherein said first shift achieves said second speed by releasing said third frictional engagement element.

4. A control system according to claim 3, further comprising a changeover valve for switching fluid pressure from one of said plurality of hydraulic control means, over to said third hydraulic servo and to a second hydraulic servo for operating said second frictional engagement element, and wherein said control unit, based on the decision to make said second shift, switches the changeover valve so that a fluid pressure from one of said plurality of hydraulic control means is switched from said third hydraulic servo to said second hydraulic servo.

5. A control system according to claim 1, wherein said automatic transmission comprises a main speed shift mechanism and an auxiliary speed shift mechanism, and wherein said first shift is performed by changing a transmission path established by one of the main speed shift mechanism and the auxiliary speed shift mechanism, and wherein said second shift is performed by changing a transmission path of the other one of the main speed shift mechanism and the auxiliary speed shift mechanism.

6. A control system according to claim 2, wherein said automatic transmission comprises a main speed shift mechanism and an auxiliary speed shift mechanism, and wherein said first shift is performed by changing a transmission path established by one of the main speed shift mechanism and the auxiliary speed shift mechanism, and wherein said second shift is performed by changing a transmission path of the other one of the main speed shift mechanism and the auxiliary speed shift mechanism.

7. A control system according to claim 3, wherein said automatic transmission comprises a main speed shift mechanism and an auxiliary speed shift mechanism, and wherein said first shift is performed by changing a transmission path established by one of the main speed shift mechanism and the auxiliary speed shift mechanism, and wherein said second shift is performed by changing a transmission path of the other one of the main speed shift mechanism and the auxiliary speed shift mechanism.

8. A control system according to claim 4, wherein said automatic transmission comprises a main speed shift mechanism and an auxiliary speed shift mechanism, and wherein said first shift is performed by changing a transmission path established by one of the main speed shift mechanism and the auxiliary speed shift mechanism, and wherein said second shift is performed by changing a transmission path of the other one of the main speed shift mechanism and the auxiliary speed shift mechanism.

9. A control system according to claim 1, wherein said control unit estimates input torque at the time said second shift is decided, and starts operation of said second shift using a fluid pressure in accordance with said estimated input torque, and wherein said estimated input torque is determined by calculating a correction value from a difference between a throttle opening that serves as a basis for the hydraulic control of said first shift and a throttle opening detected when said second shift is decided, and by applying the correction value to correct an input torque that serves as a basis for the hydraulic control of said first shift.

\* \* \* \* \*